No. 815,419. PATENTED MAR. 20, 1906.
G. W. GESNER, DEC'D.
H. C. GESNER, EXECUTRIX.
PRODUCTION OF ARTICLES OF ALLOY OF IRON AND HYDROGEN
AGGLOMERATED IN STRONG COHERENT BODIES.
APPLICATION FILED JULY 7, 1905.

Witnesses:

Inventor:

UNITED STATES PATENT OFFICE.

HARLESTON CORBETT GESNER, OF NEW YORK, N. Y., EXECUTRIX OF GEORGE W. GESNER, DECEASED.

PRODUCTION OF ARTICLES OF ALLOY OF IRON AND HYDROGEN AGGLOMERATED IN STRONG COHERENT BODIES.

No. 815,419.  Specification of Letters Patent.  Patented March 20, 1906.

Application filed July 7, 1905. Serial No. 268,749.

*To all whom it may concern:*

Be it known that GEORGE W. GESNER, deceased, late a citizen of the United States, did invent a certain new and useful Improvement in Articles of Alloy of Iron and Hydrogen and Processes of Producing the Same, of which the following is a specification.

In United States Letters Patent No. 604,580, granted May 24, 1898; No. 642,320, granted January 30, 1900, and No. 670,775, granted March 26, 1901, to the said GEORGE W. GESNER are described and claimed certain processes of making alloys of iron and hydrogen, the product being in the form of a pig or ingot, powder, or scale. According to these patents articles consisting of the alloy may be produced by remelting the pigs, powder, or scale and pouring the liquid alloy into molds, by forging or rolling heated masses of the alloy, or by heating the powder or scale and welding and shaping it by forging or rolling.

The present invention relates to the production of articles consisting of particles of the alloy of iron and hydrogen agglomerated into a strong coherent body. To produce such articles, the powdered alloy is preferably moistened and compressed into a body of the desired form. The body is then fired at a temperature sufficient to cause the component particles to frit or partially fuse together without melting down into a liquid mass.

The invention will be more readily understood by reference to the accompanying drawings, in which—

Figure 1:
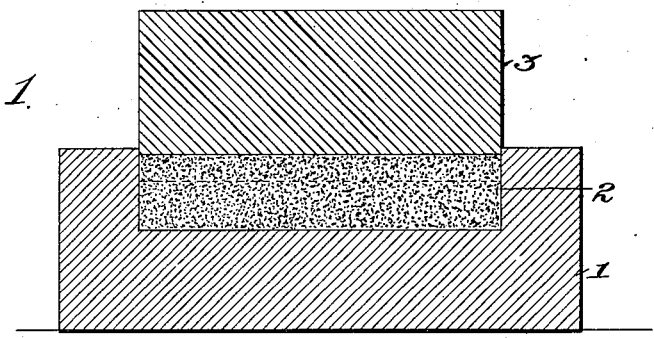
Figure 2:
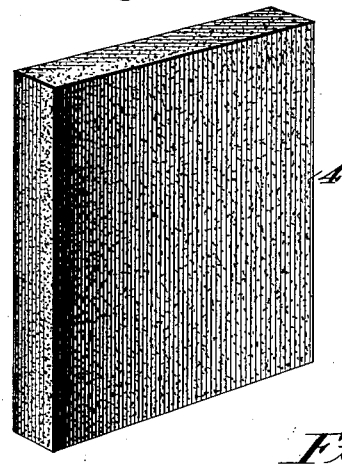
Figure 3:
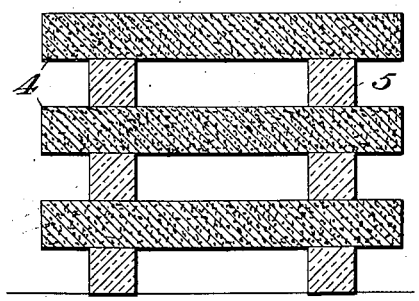
Figure 4:
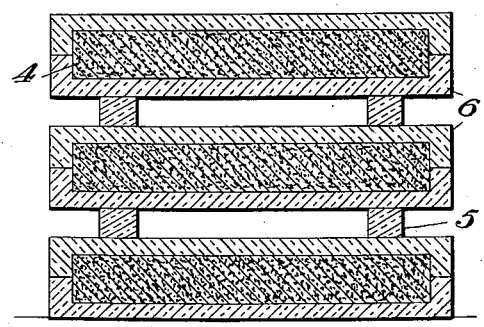

Figure 1 is a transverse vertical section of a mold for compressing the powdered alloy into a rectangular plate. Fig. 2 is a perspective view of the compressed body or plate removed from the mold. Fig. 3 is a transverse vertical section of a number of the molded plates superposed and spaced apart by pieces of fire-brick in position to be fired, and Fig. 4 is a transverse vertical section of a series of molded plates inclosed in superposed spaced muffles for firing.

The mold shown in Fig. 1 comprises a steel body 1, having a recess 2 to receive the powdered alloy, and a plunger 3. To produce the initial body or plate, the finely-pulverized alloy may be slightly and uniformly dampened with water or other liquid and is then compressed in a mold, as by hydraulic pressure, until the particles cohere sufficiently to enable the resulting plate 4 to retain its form when removed from the mold. The plates are then heated to a temperature sufficient to cause the particles to frit or partially fuse together into a strong rigid body. Plates having a thickness of one-fourth of an inch are usually maintained at a temperature of about 2,000° Fahrenheit for about two hours. For the purpose of firing the plates may be distributed within the furnace arranged in a pile or superposed with intermediate spacing-pieces 5, of fire-brick, as shown in Fig. 3. The molded plates may also be inclosed in sectional muffles or saggars 6, of refractory material, such as fire-brick, as shown in Fig. 4, the muffles being either distributed, piled one upon the other, or separated by spacers 5. After the plates have been properly fired they are preferably slowly cooled in ashes or pulverized charcoal or in an annealing-furnace, and their surfaces may finally be smoothed by grinding or otherwise.

To produce articles other than plates, suitable molds having cavities of the required shape and properly subdivided may be employed, cores or mandrels being requisite when tubular articles are to be molded. The compression may be effected by the blow of a drop-hammer instead of a hydraulic press.

The alloy described in the specified patents is a material of great value for many uses, such as the electrodes of electrochemical apparatus, chemical containers, and electrical conductors, resisters, and insulators. The present invention enables the material to be readily converted at little expense into strong and rigid articles of the desired form.

I claim as the invention of the said GEORGE W. GESNER—

1. An article consisting of particles of an alloy of iron and hydrogen, compressed and agglomerated into a strong coherent body, as set forth.

2. The process of producing articles of an alloy of iron and hydrogen, consisting in compressing the powdered alloy into a body, and heating the body to a temperature sufficient to cause the component particles to frit or partially fuse together, as set forth.

3. The process of producing articles of an alloy of iron and hydrogen, consisting in dampening the powdered alloy and compressing it into a body, and heating the body to a temperature sufficient to cause the component particles to frit or partially fuse together, as set forth.

In testimony whereof I affix my signature in presence of two witnesses.

HARLESTON CORBETT GESNER,
*Executrix of George W. Gesner, deceased.*

Witnesses:
EUGENE KELLEY,
JOHN M. CASSADY.